F. O. BOSWELL.
VEHICLE SUSPENSION AND SHOCK ABSORBER.
APPLICATION FILED JUNE 28, 1917.
1,266,656.
Patented May 21, 1918.
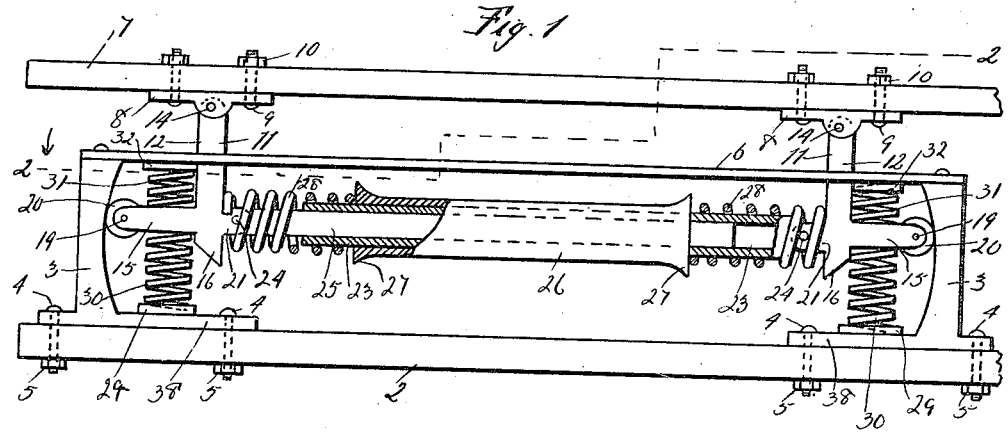
INVENTOR
Fletcher O. Boswell
By W. W. Williamson
Atty.

UNITED STATES PATENT OFFICE.

FLETCHER O. BOSWELL, OF PHILADELPHIA, PENNSYLVANIA.

VEHICLE SUSPENSION AND SHOCK-ABSORBER.

1,266,656.  Specification of Letters Patent.  Patented May 21, 1918.

Application filed June 28, 1917. Serial No. 177,445.

*To all whom it may concern:*

Be it known that I, FLETCHER O. BOSWELL, a citizen of the United States, residing at Philadelphia, in the county of Philadelphia and State of Pennsylvania, have invented new and useful Improvements in Vehicle Suspensions and Shock-Absorbers, of which the following is a specification.

My invention relates to new and useful improvements in vehicle suspensions and shock absorbers, and has for its object to provide a device of this character which will absorb the shock incident to obstructions upon the roadway and consists of arcuate tracks or runways with which coact thrust members normally forced outward or toward the arcuate tracks by means of a combination of elements acting transversely or longitudinally upon each of the thrust members simultaneously.

A further object of the invention is to provide a suitable supporting member or strut beam carrying arcuate runways or tracks with which coact suitable thrust members pivoted to a body supporting bar or the chassis said thrust members being connected to a telescoping element carrying a bar member intermediate its ends against which rest springs which normally force the thrust members outward and other springs coacting with the thrust members for assisting in the support of the vehicle body and acting as buffers to prevent undue movement of the parts.

With these ends in view, this invention consists in the details of construction and combination of elements hereinafter set forth and then specifically designated by the claims.

In order that those skilled in the art to which this invention appertains may understand how to make and use the same, I will describe its construction in detail referring by numerals to the accompanying drawings forming a part of this application in which—

Figure 1, is a view in elevation of a vehicle suspension and shock absorber made in accordance with my invention portions thereof being shown in section to clearly illustrate the construction.

Fig. 2, is a section of the line 2—2 of Fig. 1 looking in the direction of the arrow.

Fig. 3, is a side elevation or face view of one of the thrust members, and

Fig. 4, is a plan or end view thereof.

In carrying out my invention as herein embodied, 2 represents a strut beam adapted to be secured in any suitable manner to the proper part of a vehicle, such as the running gear, the front or rear axle and to this strut beam adjacent each end thereof are secured the arcuate tracks 3 by suitable fastening devices such as bolts 4 and nuts 5. The upper ends of these arcuate tracks or runways are connected by suitable reach bars 6 of which there are two, the same being spaced apart and running parallel.

The reference numeral 7 denotes a vehicle body supporting bar or a portion of the chassis having hangers 8 secured thereto by suitable means such as bolts 9 and nuts 10. To each hanger is pivotally or swingingly secured a thrust member 11 comprising a leg 12 having a hole 13 at one end thereof for the reception of the stud 14 or its equivalent whereby the thrust member may be pivoted to the hanger 8, and an outwardly projecting arm 15 at right angles to the leg 12 and a short distance from the lower end of said leg, thereby leaving an extension 16. The end of the arm 15 is bifurcated as at 17 and provided with a hole 18 for the axle 19 of the roller 20 which coacts with the arcuate track or runway.

Projecting from the leg 12 in an opposite direction to the arm 15 and approximately on a line therewith is formed a bifurcated lug 21 having a hole 22 therethrough. To the bifurcated lug of one thrust member 11 is pivotally secured a tubular member 23 by means of a stud 24 set in the hole 22 and passing through the end of the tubular member while to the bifurcated lug of the other thrust member is pivotally secured a rod 25 by means of a stud 24 the same as hereinbefore described and said rod telescopes in the tubular member. The tubular member and the rod are each of less length than the distance between the two thrust members in their normal positions to permit of a certain amount of inward movement of the thrust members without binding of the parts as will be obvious.

Upon the tubular member intermediate the ends thereof and approximately midway between the two thrust members is loosely mounted the sleeve or spool 26 having enlarged ends 27 so as to form abutment for one end of each of the springs 28 which are coiled about the telescoping element, consisting of the tubular member and rod, the other ends of said springs engaging the swinging or pivoted thrust members 11, thus normally forcing said thrust members outward to hold the rollers 20 in constant contact with the track surface of the arcuate tracks or runways 3.

Each of the arcuate track members is preferably formed with a base extension 38 having a socket 29 or other suitable attaching means for one end of the spring 30, the other end of said spring engaging or being secured to the under side of the arm 15 of the thrust member and another spring 31 engages or is secured to the upper surface of said arm while the opposite end of said spring is secured to the reach bars 6 or engages a socket 32 carried by said reach bars.

In practice, any weight evenly distributed upon the body supporting member or chassis 7 will compress the springs 30 arranged between the bases of the track members and the arms 15 of the thrust members causing said thrust members to move downward or toward the strut beam and said downward movement of the thrust members will cause the rollers 20 to run upon these portions of the arcuate tracks which are the least distance apart causing the lower ends of the thrust members to be forced inward against the action of the springs 28 so that said springs are brought into play to assist the springs 30 in cushioning and absorbing any shocks. Should the weight upon the body supporting member 7 be distributed unevenly and only one of the thrust members 11 is forced downward, the other thrust member will naturally be forced upward against the action of its spring 31 and as the track surfaces are constructed or arranged so that the upper part of one track surface and the lower part of the other track surface are a less distance apart than the central portions of said track surface on a horizontal line, the thrust members will be forced inward against the action of the springs 28 gradually increasing the tension of said springs whereby any movement of the vehicle body will be gradually stopped and the incident shock absorbed.

If for any reason, the body supporting member 7 and the strut beam 2 are moved apart as when the wheels of the vehicle suddenly drop into a depression in the roadway or when the vehicle body is returning to its normal position after a downward movement thereof, then both the springs 31 will be compressed, and the rollers 20 will be caused to run upon those portions of the arcuate tracks which are the least distance apart at the top of said tracks causing the springs 28 to be compressed so that said springs 28 and the springs 31 will gradually stop the movement of the vehicle body cushion the same and absorb any shock which would otherwise be transmitted to the vehicle body.

Of course, I do not wish to be limited to the exact details of construction as herein shown as these may be varied within the limits of the appended claims without departing from the spirit of my invention.

Having thus fully described my invention what I claim as new and patentable is—

1. In a device of the character stated a strut beam, arcuate track members secured to said beam, reach rods attached to the upper ends of said track members, a body supporting bar, hangers secured thereto, swinging members pivoted to said hangers, outwardly projecting arms carried by said swinging members, rollers journaled in said arms and engaging the arcuate track members, inwardly projecting lugs formed with said swinging members, means for normally forcing said swinging members away from each other to hold the rollers in contact with the arcuate track members, and resilient means acting upon the outwardly projecting arms of the swinging members for normally holding them in a certain position.

2. In a device of the character stated a strut beam, arcuate track members secured to said beam, reach rods attached to the upper ends of said track members, a body supporting bar, hangers secured thereto, swinging members pivoted to said hangers, outwardly projecting arms carried by said swinging members, rollers journaled in said arms and engaging the arcuate track members, inwardly projecting lugs formed with said swinging members, a tubular member pivoted to the lug of one swinging member, a rod pivoted to the lug of the other swinging member, and collapsing within said tubular member, a spool loosely mounted upon the tubular member, a spring mounted between each swinging member and each end of the spool for normally forcing the swinging members outward, a spring arranged between each of the outwardly projecting arms and the strut beam, and another spring arranged between each of said arms and the reach rods.

3. A vehicle suspension and shock absorber comprising arcuate tracks, body supporting means, thrust members pivoted to said body supporting means and coacting with the arcuate tracks, and a resilient telescoping element coacting with the thrust members for normally forcing them outward.

4. A vehicle suspension and shock absorber comprising arcuate tracks, supported by the running gear of a vehicle, a body supporting means, thrust members pivoted to said body supporting means, rollers carried by said thrust members and engaging the arcuate tracks, reach bars secured to said tracks, a spring arranged between the lower portion of each track and each thrust member, another spring arranged between the reach bars and each thrust member, telescoping means connected with the thrust members, a sleeve on said telescoping means and a spring arranged between each end of said sleeve and each thrust member for normally forcing said thrust members outward.

In testimony whereof, I have hereunto affixed my signature.

FLETCHER O. BOSWELL.